(12) United States Patent
Li et al.

(10) Patent No.: US 12,608,571 B2
(45) Date of Patent: Apr. 21, 2026

(54) DATA TRANSMISSION METHOD AND DEVICE THEREOF

(71) Applicant: HUAWEI TECHNOLOGIES CO., LTD., Shenzhen (CN)

(72) Inventors: Chenwan Li, Beijing (CN); Yiling Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 284 days.

(21) Appl. No.: 18/457,307

(22) Filed: Aug. 28, 2023

(65) Prior Publication Data

US 2023/0401397 A1 Dec. 14, 2023

Related U.S. Application Data

(63) Continuation of application No. PCT/CN2022/072454, filed on Jan. 18, 2022.

(30) Foreign Application Priority Data

Feb. 27, 2021 (CN) .......................... 202110221712.6

(51) Int. Cl.
*G06K 7/10* (2006.01)
*H04W 74/0833* (2024.01)

(52) U.S. Cl.
CPC ..... *G06K 7/10366* (2013.01); *G06K 7/10019* (2013.01); *G06K 7/10039* (2013.01); *H04W 74/085* (2013.01)

(58) Field of Classification Search
CPC .......... G06K 7/10366; G06K 7/10039; G06K 7/10019; H04W 74/0866; G06F 16/9554; H04L 1/1685
See application file for complete search history.

(56) References Cited

U.S. PATENT DOCUMENTS 9,000,891 B2 * 4/2015 Daneshmand ........... H04Q 9/00
340/10.4
2008/0088453 A1 * 4/2008 Kiji ...................... G06K 7/0008
340/572.1

(Continued)

FOREIGN PATENT DOCUMENTS

CN 101136053 A 3/2008
CN 101145181 A 3/2008

(Continued)

OTHER PUBLICATIONS

Zhao Nan et al: "Dynamic Query Tree Anti-Collision Protocol for RFID Systems", 2019 IEEE 25th International Conference on Parallel and Distributed Systems (ICPADS), IEEE, Dec. 4, 2019 (Dec. 4, 2019) , pp. 778-781, XP033700305.

(Continued)

*Primary Examiner* — Yong Hang Jiang

(57) ABSTRACT

A data transmission method and a device thereof are provided for tag access. The provided method includes: An answer device receives first signaling sent by a read/write device. The first signaling carries target flag information. The target flag information is used to determine the answer device. First flag information of the answer device matches the target flag information. The answer device determines a first slot, and sends first access information to the read/write device in the first slot. In the provided method, the first slot is determined, to avoid collision of different slots in a same slot in a next round, reduce a collision probability, and improve tag access efficiency.

14 Claims, 9 Drawing Sheets

(56) References Cited

U.S. PATENT DOCUMENTS

| | | | |
|---|---|---|---|
| 2011/0199193 A1* | 8/2011 | Sano | G06K 7/10029 |
| | | | 340/10.51 |
| 2015/0278565 A1* | 10/2015 | Bekritsky | G01S 13/825 |
| | | | 340/10.32 |
| 2016/0188930 A1* | 6/2016 | Zumsteg | G06K 7/0004 |
| | | | 235/451 |
| 2019/0007958 A1* | 1/2019 | Zhang | H04L 5/0005 |

FOREIGN PATENT DOCUMENTS

| | | | | |
|---|---|---|---|---|
| CN | 110210266 A | 9/2019 | | |
| CN | 111027335 A | 4/2020 | | |
| EP | 1914659 A1 | 4/2008 | | |
| KR | 101268844 B1 * | 5/2013 | | G06K 19/0723 |

OTHER PUBLICATIONS

EPC global: "Specification for RFID Air Interface EPC™ Radio-Frequency Identity Protocols Class-1 Generation-2 UHF RFID Protocol for Communications at 860 MHz-960 MHz Version 1.2.0." Oct. 23, 2008. total 108 pages.

* cited by examiner

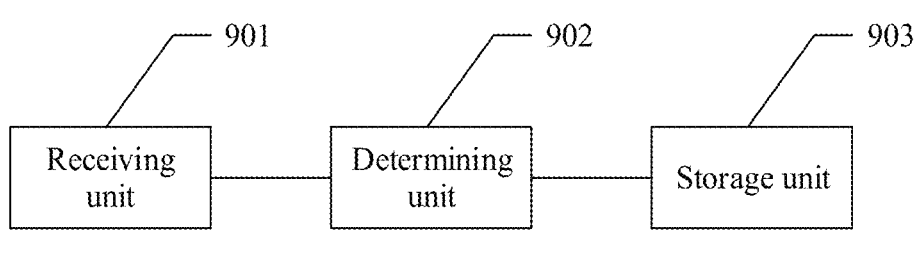
FIG. 9
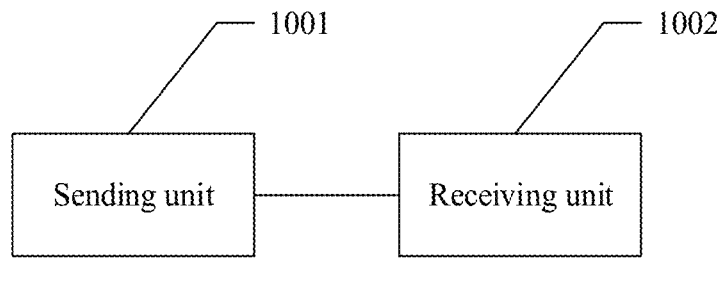
FIG. 10
FIG. 11

DATA TRANSMISSION METHOD AND DEVICE THEREOF

CROSS-REFERENCE TO RELATED APPLICATIONS

This application is a continuation of International Application No. PCT/CN2022/072454, filed on Jan. 18, 2022, which claims priority to Chinese Patent Application No. 202110221712.6, filed on Feb. 27, 2021. The disclosures of the aforementioned applications are hereby incorporated by reference in their entireties.

TECHNICAL FIELD

Embodiments of this application relate to the field of communication technologies, and specifically, to a data transmission method and a device thereof.

BACKGROUND

A basic working principle of a passive radio frequency identification (RFID) technology is not complex. When a tag enters a magnetic field, the tag receives a radio frequency signal sent from a read/write device, and sends, by using power obtained from an induced current, product information (a passive tag) stored in a chip. A reader reads and decodes the information, and then transmits the information to a central information system for related data processing.

A plurality of tags may enter one magnetic field at the same time. The tag determines an access slot based on time at which the read/write device sends a command. When the tag reaches the access slot, the tag sends access information to the read/write device. After the read/write device receives the information and returns acknowledgment information, it indicates that the tag successfully performs access.

However, if a plurality of tags in one magnetic field send access information in a same slot, collision occurs in the slot, which causes an access failure. A tag that fails to perform access continues to randomly determine an access slot. Consequently, tags that collide in different slots next time may still choose to send access messages in a same slot, and collision still occurs, which causes low access efficiency of the tag.

SUMMARY

Embodiments of this application provide a data processing method for tag access, to avoid collision of different slots in a same slot in a next round, reduce a collision probability, and improve tag access efficiency.

According to a first aspect, an embodiment of this application provides a data transmission method, including:

An answer device receives first signaling sent by a read/write device. The first signaling carries target flag information. The target flag information is used to determine the answer device. First flag information of the answer device matches the target flag information. The answer device determines a first slot, and sends first access information to the read/write device in the first slot.

In this embodiment of this application, collision of different slots in a same slot in a next round can be avoided, a collision probability is reduced, and tag access efficiency is improved.

According to the method in the first aspect in this embodiment of this application, in an implementation, after the answer device sends the first access information to the read/write device, the method further includes: If the answer device fails to receive an acknowledgment message sent by the read/write device, the answer device stores the first slot. The first slot indicates a quantity of slots corresponding to an access failure of the answer device. The access failure indicates that the answer device fails to receive a response message sent by the read/write device for the first access information sent by the answer device. The answer device receives a third trigger message sent by the read/write device. The third trigger message carries a target slot. The target slot includes the first slot. The third trigger message indicates the answer device corresponding to the target slot to perform re-access.

In this embodiment of this application, the third trigger message carries a quantity of first slots, and the quantity of first slots indicates a quantity of slots corresponding to the access failure of the answer device, so that tags that collide in a same slot perform a next round of access. This avoids collision of different slots in a same slot in a next round, reduces a collision probability, and improves tag access efficiency.

According to the method in the first aspect in this embodiment of this application, in an implementation, the third trigger message carries the target flag information.

In this embodiment of this application, the third trigger message carries the target flag information, and the target flag information does not need to be separately sent. This reduces signaling overheads.

According to the method in the first aspect in this embodiment of this application, in an implementation, the target flag information includes a nonconsecutive mask, and the nonconsecutive mask includes at least two nonconsecutive bits.

In this embodiment of this application, the target flag information carries the nonconsecutive mask, to meet a requirement of a tag with the nonconsecutive mask for inventory. In comparison with a consecutive mask, a plurality of consecutive masks do not need to be sent to achieve effect of the nonconsecutive mask. This reduces the signaling overheads and improves efficiency.

According to the method in the first aspect in this embodiment of this application, in an implementation, the third trigger message includes a variable P, where $P=Q+n$, $P=Q-n$, or $P=Q*n$, n is a positive integer greater than or equal to 1, and Q is used by the answer device to determine the first slot.

In this embodiment of this application, a plurality of manners are set for the variable P, to improve flexibility of the re-access of the answer device.

According to the method in the first aspect in this embodiment of this application, in an implementation, the first signaling and/or the third trigger message belong/belongs to any one of the following: RRC signaling, a MAC subheader, or MAC CE signaling.

In this embodiment of this application, a form of the first signaling and/or a form of the third trigger message are/is described. This improves implementability of the solution.

According to the method in the first aspect in this embodiment of this application, in an implementation, the third trigger message further carries a level quantity. The level quantity indicates a quantity of times that collision occurs in the answer device. The third trigger message indicates the answer device that matches the target flag information, the target slot, and the level quantity to perform re-access.

In this embodiment of this application, the third trigger message further carries a level quantity, to distinguish same collision slots of different levels. This avoids simultaneous access of excessive tags under a same indication, also reduces an average quantity of access tags at a same moment, and reduces a collision probability.

According to the method in the first aspect in this embodiment of this application, in an implementation, the target slot includes a plurality of first collision slots, and the first collision slot includes the first slot.

In this embodiment of this application, a collision slot is indicated, and a tag performs access, to implement packet access. This avoids access of a large quantity of tags at the same time, reduces a collision probability generated during tag access, and improves access efficiency.

According to the method in the first aspect in this embodiment of this application, in an implementation, target slots are a plurality of consecutive first collision slots, or target slots are a plurality of discrete first collision slots.

In this embodiment of this application, it is noted that the target slot may be the plurality of consecutive first collision slots, or may be the plurality of discrete first collision slots. This improves flexibility of the solution.

According to a second aspect, an embodiment of this application provides a data transmission method, including:

A read/write device sends first signaling to an answer device. The first signaling carries target flag information. The target flag information is used to determine the answer device. The first flag information of the answer device matches the target flag information. The read/write device receives first access information sent by the answer device.

In this embodiment of this application, collision of different slots in a same slot in a next round can be avoided, a collision probability is reduced, and tag access efficiency is improved.

According to the method in the second aspect in this embodiment of this application, in an implementation, after the read/write device receives the first access information sent by the answer device, the method further includes: When the read/write device detects that an access failure occurs in the answer device, the read/write device stores a first slot of the answer device. The first slot indicates a quantity of slots corresponding to the access failure of the answer device. The access failure indicates that the answer device fails to receive a response message sent by the read/write device for the first access information sent by the answer device. The read/write device sends a third trigger message. The third trigger message carries a target slot. The target slot includes the first slot. The third trigger message indicates the answer device corresponding to the target slot to perform re-access.

In this embodiment of this application, the third trigger message carries a quantity of first slots, and the quantity of first slots indicates a quantity of slots corresponding to the access failure of the answer device, so that tags that collide in a same slot perform a next round of access. This avoids collision of different slots in a same slot in a next round, reduces a collision probability, and improves tag access efficiency.

According to the method in the second aspect in this embodiment of this application, in an implementation, the third trigger message carries the target flag information.

In this embodiment of this application, the third trigger message carries the target flag information, and the target flag information does not need to be separately sent. This reduces signaling overheads.

According to the method in the second aspect in this embodiment of this application, in an implementation, the target flag information includes a nonconsecutive mask, and the nonconsecutive mask includes at least two nonconsecutive bits.

In this embodiment of this application, the target flag information carries the nonconsecutive mask, to meet a requirement of a tag with the nonconsecutive mask for inventory. In comparison with a consecutive mask, a plurality of consecutive masks do not need to be sent to achieve effect of the nonconsecutive mask. This reduces the signaling overheads and improves efficiency.

According to the method in the second aspect in this embodiment of this application, in an implementation, the third trigger message includes a variable P, where P=Q+n, P=Q−n, or P=Q*n, n is a positive integer greater than or equal to 1, and Q is used by the answer device to determine the first slot.

In this embodiment of this application, a plurality of manners are set for the variable P, to improve flexibility of the re-access of the answer device.

According to the method in the second aspect in this embodiment of this application, in an implementation, the third trigger message further carries a level quantity. The level quantity indicates a quantity of times that collision occurs in the answer device. The third trigger message indicates the answer device that matches the target flag information, the target slot, and the level quantity to perform re-access.

In this embodiment of this application, the third trigger message further carries a level quantity, to distinguish same collision slots of different levels. This avoids simultaneous access of excessive tags under a same indication, and also reduces an average quantity of access tags at a same moment, to reduce a collision probability.

According to the method in the second aspect in this embodiment of this application, in an implementation, the target slot includes a plurality of first collision slots, and the first collision slot includes the first slot.

In this embodiment of this application, a collision slot is indicated, and a tag performs access, to implement packet access. This avoids access of a large quantity of tags at the same time, and reduces a collision probability generated during the tag access, and improves access efficiency.

According to the method in the second aspect in this embodiment of this application, in an implementation, target slots are a plurality of consecutive first collision slots, or target slots are a plurality of discrete first collision slots.

In this embodiment of this application, it is noted that the target slot may be the plurality of consecutive first collision slots, or may be the plurality of discrete first collision slots. This improves flexibility of the solution.

According to a third aspect, an embodiment of this application provides an answer device, including:

a receiving unit, configured to receive first signaling sent by a read/write device, where the first signaling carries target flag information, the target flag information is used to determine the answer device, and first flag information of the answer device matches the target flag information; and a determining unit, configured to determine a first slot, and send first access information to the read/write device in the first slot.

Based on the answer device in the third aspect in this embodiment of this application, in an implementation, if the receiving unit fails to receive an acknowledgment message sent by the read/write device, the answer device further includes:

a storage unit, configured to store the first slot. The first slot indicates a quantity of slots corresponding to an access failure of the answer device. The access failure indicates that the answer device fails to receive a response message sent by the read/write device for the first access information sent by the answer device.

The receiving unit is further configured to receive a third trigger message sent by the read/write device. The third trigger message carries a target slot. The target slot includes the first slot. The third trigger message indicates the answer device corresponding to the target slot to perform re-access.

Based on the answer device in the third aspect in this embodiment of this application, in an implementation, the third trigger message carries the target flag information.

Based on the answer device in the third aspect in this embodiment of this application, in an implementation, the target flag information includes a nonconsecutive mask, and the nonconsecutive mask includes at least two nonconsecutive bits.

Based on the answer device in the third aspect in this embodiment of this application, in an implementation, the third trigger message includes a variable P, where P=Q+n, P=Q−n, or P=Q*n, n is a positive integer greater than or equal to 1, and Q is used by the answer device to determine the first slot.

Based on the answer device in the third aspect in this embodiment of this application, in an implementation, the first signaling and/or the third trigger message belong/belongs to any one of the following: radio resource control (RRC) signaling, a medium access control (MAC) subheader, or medium access control control element (MAC CE) signaling.

In this embodiment of this application, a form of the first signaling and/or a form of the third trigger message are/is described. This improves implementability of a solution.

Based on the answer device in the third aspect in this embodiment of this application, in an implementation, the third trigger message further carries a level quantity. The level quantity indicates a quantity of times that collision occurs in the answer device. The third trigger message indicates the answer device that matches the target flag information, the target slot, and the level quantity to perform re-access.

Based on the answer device in the third aspect in this embodiment of this application, in an implementation, the target slot includes a plurality of first collision slots, and the first collision slot includes the first slot.

Based on the answer device in the third aspect in this embodiment of this application, in an implementation, target slots are a plurality of consecutive first collision slots, or target slots are a plurality of discrete first collision slots.

Method steps performed by units of the answer device in the third aspect in this embodiment of this application are similar to method steps performed by the answer device in the first aspect. Details are not described herein again.

According to a fourth aspect, an embodiment of this application provides a read/write device, including:

a sending unit, configured to send first signaling to an answer device, where the first signaling carries target flag information, the target flag information is used to determine the answer device, and first flag information of the answer device matches the target flag information; and a receiving unit, configured to receive first access information sent by the answer device.

Based on the read/write device in the fourth aspect in this embodiment of this application, in an implementation, when the read/write device detects that an access failure occurs in the answer device, the read/write device further includes:

a storage unit, configured to store a first slot of the answer device. The first slot indicates a quantity of slots corresponding to the access failure of the answer device. The access failure indicates that the answer device fails to receive a response message sent by the read/write device for the first access information sent by the answer device.

The sending unit is further configured to send a third trigger message. The third trigger message carries a target slot. The target slot includes the first slot. The third trigger message indicates the answer device corresponding to the target slot to perform re-access.

Based on the read/write device in the fourth aspect in this embodiment of this application, in an implementation, the third trigger message carries the target flag information.

Based on the read/write device in the fourth aspect in this embodiment of this application, in an implementation, the target flag information includes a nonconsecutive mask, and the nonconsecutive mask includes at least two nonconsecutive bits.

Based on the read/write device in the fourth aspect in this embodiment of this application, in an implementation, the third trigger message includes a variable P, where P=Q+n, P=Q−n, or P=Q*n, n is a positive integer greater than or equal to 1, and Q is used by the answer device to determine the first slot.

According to the method in the fourth aspect in this embodiment of this application, in an implementation, the first signaling and/or the third trigger message belong/belongs to any one of the following: RRC signaling, a MAC subheader, or MAC CE signaling.

In this embodiment of this application, a form of the first signaling and/or a form of the third trigger message are/is described. This improves implementability of the solution.

Based on the read/write device in the fourth aspect in this embodiment of this application, in an implementation, the third trigger message further carries a level quantity. The level quantity indicates a quantity of times that collision occurs in the answer device. The third trigger message indicates the answer device that matches the target flag information, the target slot, and the level quantity to perform re-access.

Based on the read/write device in the fourth aspect in this embodiment of this application, in an implementation, the target slot includes a plurality of first collision slots, and the first collision slot includes the first slot.

Based on the read/write device in the fourth aspect in this embodiment of this application, in an implementation, target slots are a plurality of consecutive first collision slots, or target slots are a plurality of discrete first collision slots.

Method steps performed by units of the read/write device in the fourth aspect in this embodiment of this application are similar to method steps performed by the read/write device in the second aspect. Details are not described herein again.

According to a fifth aspect, this application provides a computer storage medium. The computer storage medium stores instructions, and when the instructions are executed on a computer, the computer is enabled to perform the method in the implementations of the first aspect and the second aspect of this application.

According to a sixth aspect, this application provides a computer program product. When the computer program product is executed on a computer, the computer is enabled to perform the method in the implementations of the first aspect and the second aspect of this application.

It can be learned from the foregoing technical solutions that embodiments of this application have the following advantages.

In embodiments of this application, the third trigger message carries the quantity of first slots, and the quantity of first slots indicates the quantity of slots corresponding to the access failure of the answer device, so that the tags that collide in the same slot performs the next round of access. This avoids collision of different slots in the same slot in the next round, reduces a collision probability, and improves tag access efficiency.

BRIEF DESCRIPTION OF DRAWINGS

FIG. 9 is a diagram of another structure of an answer device according to an embodiment of this application;

FIG. 10 is a diagram of a structure of a read/write device according to an embodiment of this application;

FIG. 11 is a diagram of another structure of a read/write device according to an embodiment of this application;

DESCRIPTION OF EMBODIMENTS

Embodiments of this application provide a data transmission method and a device thereof for tag access, to avoid collision of different slots in a same slot in a next round, reduce a collision probability, and improve tag access efficiency.

The following describes technical solutions in embodiments of this application with reference to the accompanying drawings in embodiments of this application. It is clear that the described embodiments are merely some rather than all of embodiments of this application. All other embodiments obtained by a person of ordinary skill in the art according to embodiments of this application without creative efforts shall fall within the protection scope of this application.

Figure 1:
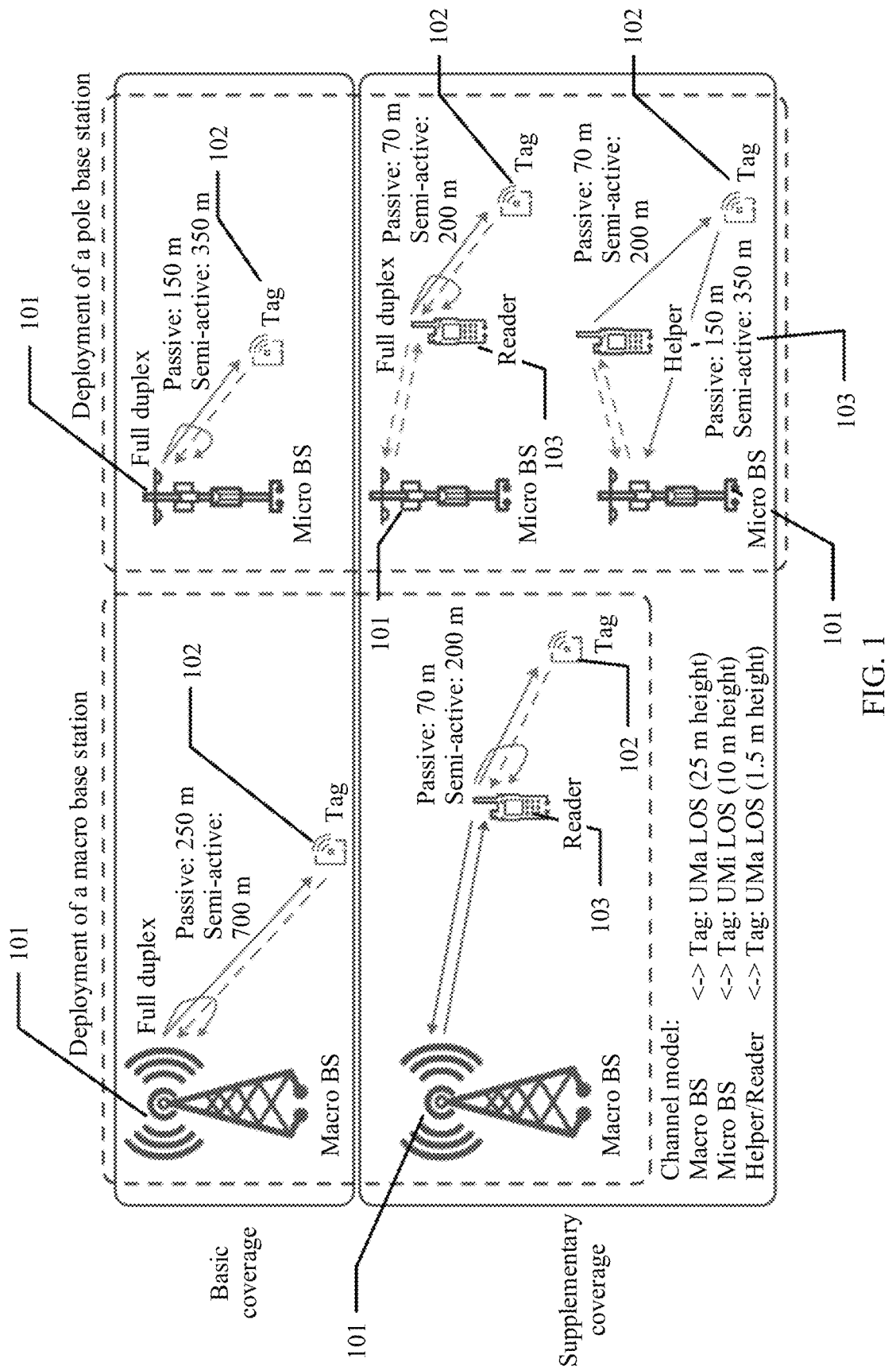
FIG. 1 is a diagram of an architecture of a data transmission system according to an embodiment of this application.

FIG. 1 is a diagram of an architecture of a data transmission system according to an embodiment of this application.

As shown in FIG. 1, the data transmission system provided in this embodiment of this application includes a plurality of application scenarios, including a basic coverage scenario in which a macro base station is deployed, a supplementary coverage scenario in which a macro base station is deployed, a basic coverage scenario in which a pole base station is deployed, and a supplementary coverage scenario in which a pole base station is deployed. The following separately describes the plurality of application scenarios of the data transmission system provided in this embodiment of this application.

In the basic coverage scenario in which a macro base station is deployed, at least one base station 101 and at least one tag 102 are included. The tag 102 is connected to the base station 101. A maximum connection distance between a passive tag of the tag 102 and the base station 101 is 250 meters. A maximum connection distance between a semi-active tag of the tag 102 and the base station 101 is 700 meters. It should be noted that, in this scenario, the base station 101 may act as a read/write device, and send a radio frequency signal to the tag 102, so that the tag 102 obtains energy from the radio frequency signal and an induced current of the tag 102 to send information to the base station.

In the supplementary coverage scenario in which a macro base station is deployed, at least one base station 101, at least one tag 102, and at least one read/write device 103 are included. The tag 102 is connected to the read/write device 103. The read/write device 103 is connected to the base station 101. A maximum connection distance between a passive tag of the tag 102 and the base station 101 is 70 meters. A maximum connection distance between a semi-active tag of the tag 102 and the base station 101 is 200 meters. It should be noted that, in this scenario, the base station 101 may also act as a read/write device, that is, the base station 101 may be directly connected to the tag 102, or may be connected to the read/write device 103. In other words, the tag 102 may send an uplink signal to the read/write device 103, and then directly receive a downlink signal by using the base station 101. Alternatively, the tag 102 receives a downlink signal by using the read/write device 103, and directly sends an uplink signal to the base station 101. This is not limited herein.

In the basic coverage scenario in which a pole base station is deployed, at least one micro base station 101 and at least one tag 102 are included. The tag 102 is connected to the micro base station 101. A maximum connection distance between a passive tag of the tag 102 and the micro base station 101 is 150 meters. A maximum connection distance between a semi-active tag of the tag 102 and the micro base station 101 is 350 meters. It should be noted that, in this scenario, the micro base station 101 may act as a read/write device, and send a radio frequency signal to the tag 102, so that the tag 102 obtains energy from the radio frequency signal and an induced current of the tag 102 to send information to the micro base station.

In the supplementary coverage scenario in which a pole base station is deployed, at least one micro base station 101, at least one tag 102, and at least one read/write device 103 are included. The tag 102 is connected to the read/write device 103. The read/write device 103 is connected to the micro base station 101. A maximum connection distance between a passive tag of the tag 102 and the micro base station 101 is 70 meters. A maximum connection distance between a semi-active tag of the tag 102 and the micro base station 101 is 200 meters. It should be noted that, in this scenario, the micro base station 101 may also act as a read/write device, that is, the micro base station 101 may be directly connected to the tag 102, or may be connected to the read/write device 103. In other words, the tag 102 may send an uplink signal to the read/write device 103, and then directly receive a downlink signal by using the micro base station 101. Alternatively, the tag 102 receives a downlink signal by using the read/write device 103, and directly sends an uplink signal to the micro base station 101. This is not limited herein.

Figure 2:
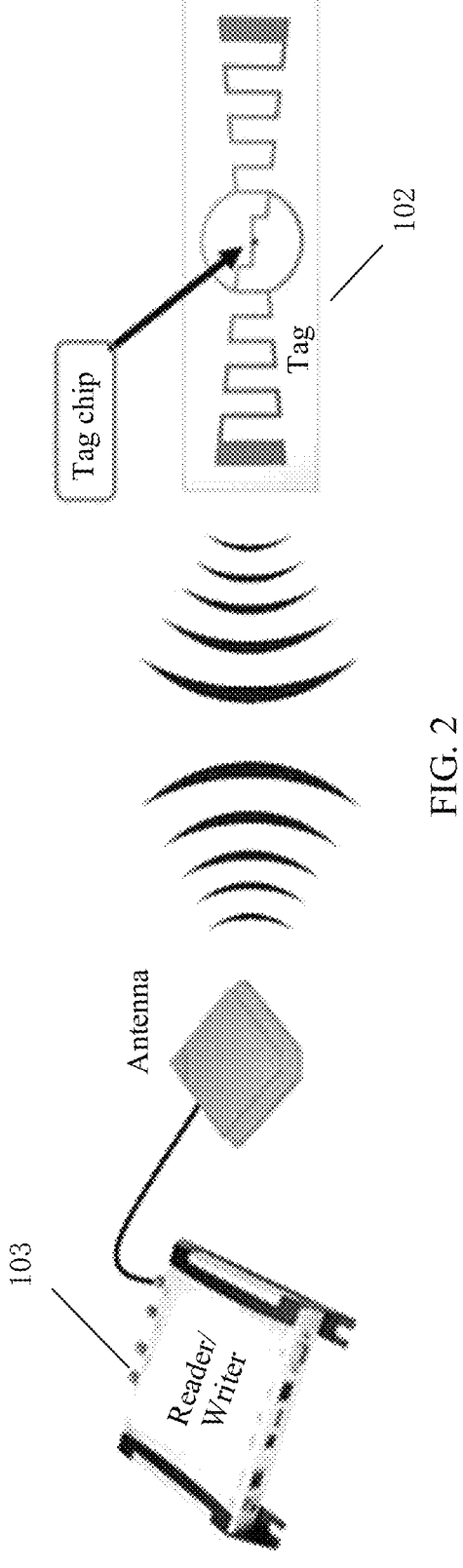
FIG. 2 is a diagram of a scenario of a data transmission system according to an embodiment of this application.

A transmission manner between the read/write device 103 and the tag 102 may be shown in FIG. 2. After entering a magnetic field, the tag 102 receives a radio frequency signal sent by the read/write device 103, obtains energy from the radio frequency signal and an induced current of the tag 102, and sends product information stored in a tag chip to the read/write device 103. After reading and decoding the information, the read/write device 103 sends the information to a central information system for related data processing.

The following explains terms that may be used in embodiments of this application.

A terminal is also referred to as user equipment (UE), a mobile station (MS), a mobile terminal (MT), or the like, and is a device that provides a user with voice and/or data connectivity, for example, a handheld device or a vehicle-mounted device that has a wireless connection function. Currently, some examples of the terminal are a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, or the like.

An access network device is a radio access network (RAN) node (or device) that connects a terminal to a wireless network, and may also be referred to as a base station. Currently, some examples of the RAN node are a further evolved NodeB (gNB), a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), a wireless fidelity (Wi-Fi) access point (AP), or the like. In addition, in a network structure, the access network device may include a central unit (CU) node, a distributed unit (DU) node, or a RAN device including a CU node and a DU node. The RAN device including the CU node and the DU node splits protocol layers of an eNB in a long term evolution (LTE) system. Functions of some protocol layers are centrally controlled by the CU, functions of some or all of remaining protocol layers are distributed in the DU, and the CU centrally controls the DU.

In an implementation, an answer device may be a tag, or an electronic tag, namely, an RFID tag, which is a common name of RFID. RFID is short for radio frequency identification. The radio frequency identification technology can be divided into three types: an active type, a passive type, and a semi-active type. A passive tag may also be referred to as passive IoT, namely, a passive internet of things device. Therefore, the passive tag may also be considered as a terminal.

A read/write device is a portable or fixed device that reads (sometimes writes) tag information. This is an original definition. Alternatively, the read/write device may be understood as a device that communicates with a tag, for example, may be a terminal, or may be a base station, or may be a device with a read/write function, for example, a reader/writer. This is not limited herein.

Based on the architecture of the data transmission system and the application scenario of a data transmission method shown in FIG. 1, the following describes in detail the data transmission method in embodiments of this application.

In this embodiment, an example in which a reader/writer is a read/write device and a target tag is an answer device is used for description.

Figure 3:
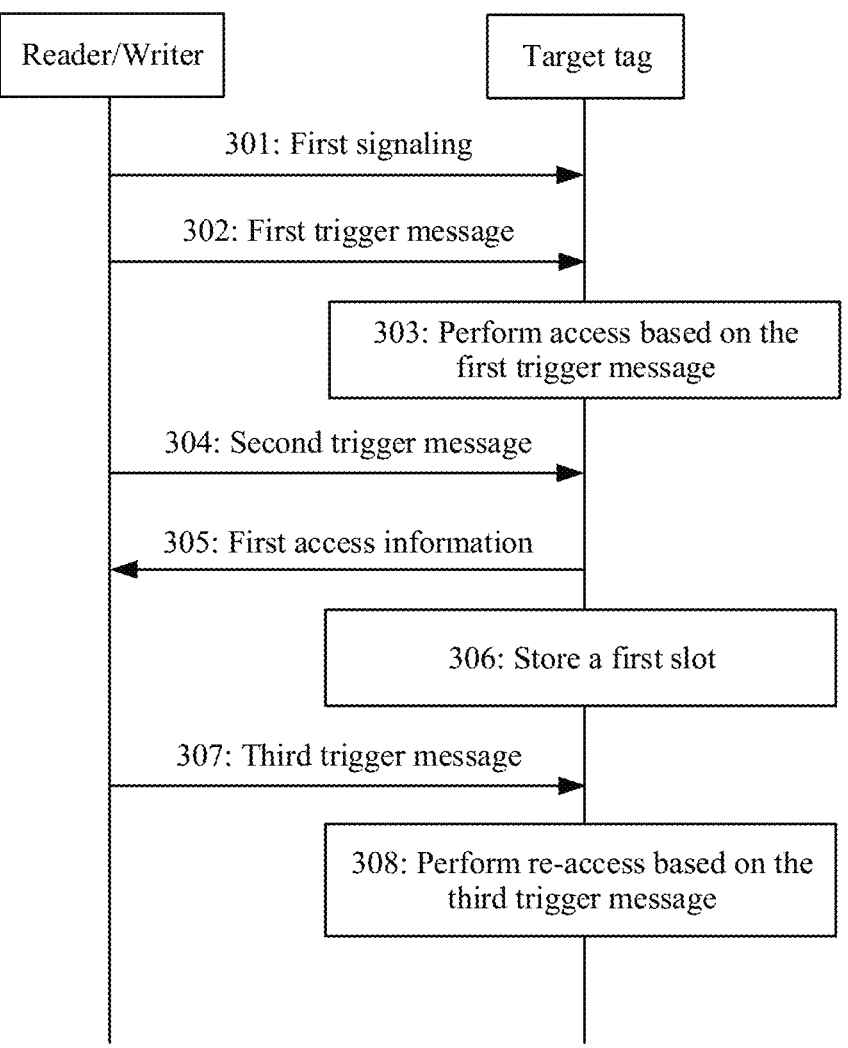
FIG. 3 is a flowchart of a data transmission method according to an embodiment of this application.

FIG. 3 is a flowchart of a data transmission method according to an embodiment of this application.

Step 301: A reader/writer sends first signaling to a target tag.

When a target tag enters a magnetic field in which the reader/writer is located, the reader/writer sends first signaling to an answer device. The first signaling carries target flag information. The target flag information is used to determine the target tag. First flag information of the target tag matches the target flag information.

The first signaling may be RRC signaling such as select signaling, and a name is not limited, or the first signaling may be MAC signaling such as MAC CE.

A select instruction may be a select instruction or query signaling sent by the reader/writer to the target tag. It may be understood that, in an actual application process, the first signaling may also be another instruction sent by the reader/writer to the target tag, which is not limited herein.

It should be noted that when sending the first signaling, the reader/writer sends the first signaling to all tags that enter a magnetic field range. The first signaling is used to select the target tag from all tags. The first signaling may carry the target flag information. The target flag information may include flag bit information or group information. Different flag bit information or group information corresponds to tags of different types. For example, a flag bit A has 50 tags, or a group B has 50 tags.

In an implementation, the first signaling may further carry a mask segment and storage location information. The storage location information indicates a location of the mask. The mask may be indicated by using information such as a start location of a storage interval and a length of a character string segment. The storage location information may include at least one of a memory interval (for example), a start address, or mask length information. The target flag information and/or mask information and/or the storage location information in the first signaling may indicate character string information and/or flag bit information of a storage interval in the tag. If the character string information in the target tag is the same as the character string information and/or the flag bit information in the first signaling, it indicates that the target tag is a tag selected by the reader/writer. These tags may initiate an access process subsequently.

In an implementation, the first signaling may carry first group identification information and a second mask. A first group identifier may be an address group identifier, a memory location group identifier, or the like. For example, one identifier corresponds to at least one of one memory (for example, an EPC, a TID, or a user area), a start address, or a mask length. The second mask is a character string segment, for example, a character string in a unit of byte. The first group identification information and the second mask may be used to determine the target tag, namely, the target flag information or a tag selected for inventory or access. Alternatively, the first group identifier may be a first address identifier.

In an implementation, the first signaling may include consecutive or nonconsecutive indication information, to indicate whether the mask in the first signaling is encoded based on a consecutive bit or encoded based on a nonconsecutive bit.

In an implementation, the first signaling may include second group identification information to indicate that a tag with the second group identification information, or a tag matching the second group identification information, accesses a network. A second group identifier may identify a character string segment of a storage location or bit string information at a storage location. The tag receives the information. If the information matches or is consistent with corresponding location information in a tag memory, the tag can access the reader/writer or a network device.

Information corresponding to the first group identification information and information corresponding to the second group identification information may be pre-configured, or may be exchanged at an application layer.

In an implementation, the first signaling may include a consecutive or nonconsecutive indication, to indicate whether the mask is a consecutive mask.

In an implementation, the first signaling may include an active reporting indication, to indicate a tag that needs to be actively reported to perform access.

In an implementation, the mask indicates a nonconsecutive mask segment (a string of nonconsecutive bits). The nonconsecutive mask may indicate identification information, or may indicate a nonconsecutive mask segment in a storage interval of the target tag. The identification information may be an electronic product code (EPC) identifier ID or a tag identifier (TID), or may be other identification information such as a subscription permanent identifier (SUPI) or an subscription concealed identifier (SUCI). This is not limited herein.

Figure 4A:
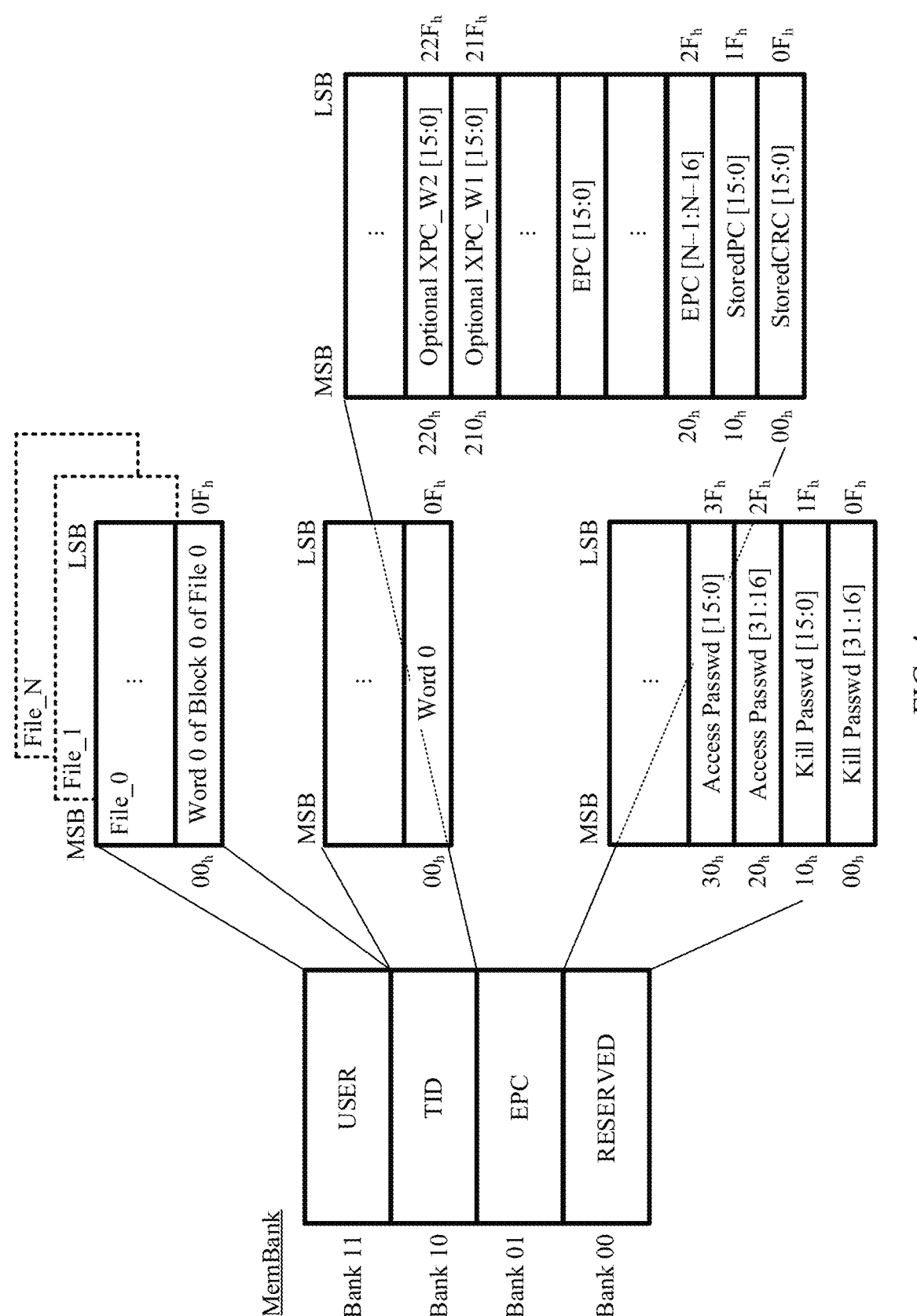
FIG. 4a is a diagram of effect of signaling according to an embodiment of this application.
Figure 5:
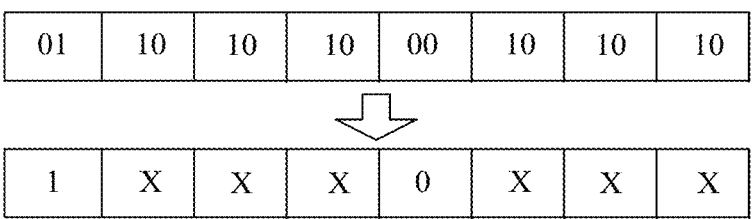
FIG. 5 is a diagram of effect of a data transmission method according to an embodiment of this application.
Figure 6:
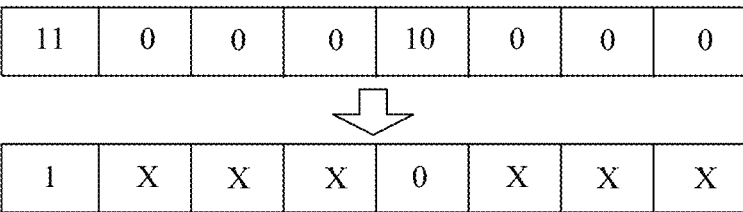
FIG. 6 is a diagram of other effect of a data transmission method according to an embodiment of this application.

The identification information may indicate a storage area location and the nonconsecutive mask segment, and may indicate some fields in a storage area. For example, as shown in FIG. 4a, one target tag includes a plurality of storage areas such as USER, TID, EPC, and RESEVED. In the plurality of storage areas, each storage area further includes a plurality of pieces of field information. The plurality of pieces of field information in each storage area are divided into several groups for storage, for example, a plurality of field groups from 00 h to 0 Fh and from 10 h to 1 Fh, where 00 h indicates a header location of a group. When a specific location in a USER field needs to be indicated, a specific field in a field group may be indicated by indicating a USER identifier, adding a location of a specific word or byte, for example, 00h indicates a location of the mask, and adding the nonconsecutive mask segment. Two bits may indicate one character. As shown in FIG. 5, 0110101000101010 indicates a nonconsecutive field 1XXX0XXX. A mask 01 indicates that a first character is 1. A mask 01 indicates a character X. X indicates any character, that is, 0/1 is not limited. 00 indicates that a character at a location of a fourth character is 0. Therefore, the nonconsecutive mask segment indicates that, in the field group, the first character is 1 and the fourth character is a tag corresponding to 0. In an implementation, as shown in FIG. 6, 11 may indicate 1, 10 may indicate and 0 may indicate X. A mask indication manner is not limited herein.

Optionally, each character of the nonconsecutive mask may be indicated by one or more bits. Alternatively, a combination of the nonconsecutive bits at a plurality of nonconsecutive locations may be used, for example, a combination of a plurality of storage area locations and different mask bits, for example, TID area-start location 07h-bit 1, and (TID area, optional)-start location 21h-bit 01. The nonconsecutive mask is indicated by a combination of two indications.

An advantage of using the nonconsecutive mask is that a requirement of a tag with the nonconsecutive mask for inventory is met. In comparison with the consecutive mask, a plurality of consecutive masks do not need to be sent to achieve effect of the nonconsecutive mask. This reduces the signaling overheads and improves efficiency.

Alternatively, in an implementation, a location may be indicated by using identification information, location information, and the nonconsecutive mask. For example, a location of a memory area TID is 17H, and the nonconsecutive mask segment 0110101000101010 indicates that a character at 17H is 1, and that a character at 13H is 0. The mask 01 indicates that the first character is 1. X indicates any character. 00 indicates that a character at a location of a fourth character starting from 17H is 0.

In an implementation, the select instruction further carries a level quantity. The level quantity indicates a quantity of times that collision occurs on the target tag. If the target tag receives the select instruction for the first time, the level quantity may be recorded as 1, to indicate a first-time access without collision. If the level quantity is 2, it indicates that collision occurs for one time on the target tag. It may be understood as that, the level quantity may alternatively be indicated in another manner. For example, during a first-time access, the level quantity is recorded as 0. After collision occurs for one time, the level quantity is recorded as 1. An indication manner of the level quantity is not limited herein. It should be noted that the level quantity may alternatively be carried in another message sent by the reader/writer to the target tag, for example, carried in a first trigger message. This is not limited herein. An advantage of using the level quantity is that same collision slots of different levels may be distinguished. This avoids simultaneous access of excessive tags under a same indication, reduces an average quantity of access tags at a same moment, and reduces a collision probability.

It should be noted that the mask information, address information, or the like may be interpreted by a base station, and may be carried in signaling in a form of the character string, for example, OCTET STRING.

Step 302: The reader/writer sends the first trigger message to the target tag.

The reader/writer may send the first trigger message to the target tag. The first trigger message is used to trigger the target tag to generate a random number K. A value of K is a positive integer greater than 0.

Optionally, the first trigger message includes a first parameter Q. The first parameter Q is used by the target tag to generate the random number K based on the first parameter Q.

The first trigger message may be a query message. The query message is used to enable a tag that matches a flag bit and a mask that are indicated by the first signaling to generate the random number K. In an actual application process, the first trigger message may alternatively be another message. This is not limited herein.

Figure 4B:
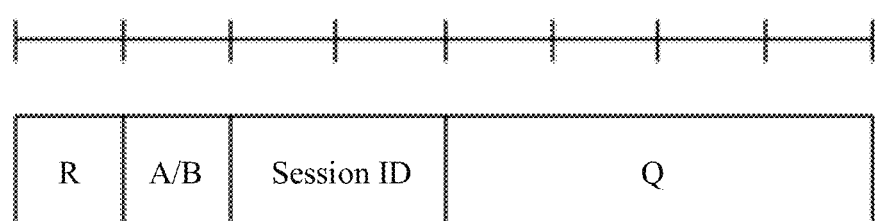
FIG. 4b is a diagram of a structure of signaling according to an embodiment of this application.

The first trigger message may be RRC signaling such as select signaling or query, and a name is not limited, or the first trigger message may be MAC signaling such as MAC CE. As shown in FIG. 4b, MAC CE separately includes a session identifier, a flag bit, a Q value, or the like, where 2-bit session ID is used to identify the session identifier, 1-bit A/B indicates that a corresponding session flag bit is A or B, 4-bit Q is a maximum value used to generate a random number, and R is a 1-bit reserved bit. The following provides an example of only one format of MAC CE.

Optionally, the first trigger message may be bound to the Q value by default and does not need to be sent. For example, if a bound Q value is 2, there are four slots that can be used by a first tag device to select one of the slots to access the reader/writer. An advantage of the bound Q value is that the signaling overheads are reduced. An advantage of Q being 2 is that average total access efficiency is high.

It should be noted that, in an actual application process, step 302 and step 301 may share one piece of signaling, that is, the first trigger message and the first signaling are included in a same message. Alternatively, the first trigger message and the first signaling are a same message.

Step 303: The target tag prepares access based on the first trigger message.

After the target tag receives the first trigger message, the target tag generates the random number K based on the first trigger message.

In an implementation, a value range of the random number K may be $(0, 2^Q-1)$, where a value of Q is a positive integer greater than 0. A manner for obtaining Q is described in step 302. Details are not described herein again.

Step 304: The reader/writer sends a second trigger message to the target tag.

After the target tag generates the random number K, the reader/writer continues to send the second trigger message to the target tag. The second trigger message is used to trigger the target tag to update the value of the random number K to K−1, or K−n, where n>0. In other words, the K value may be updated when the second trigger message is received. This is not limited herein.

Figure 4C:
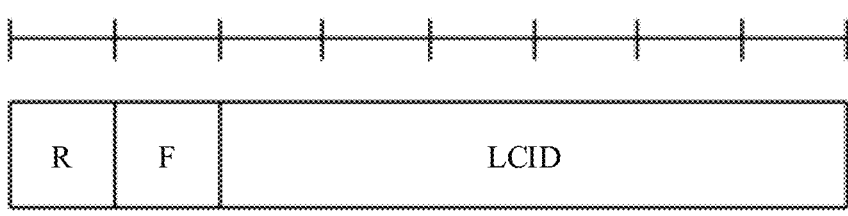
FIG. 4c is a diagram of another structure of signaling according to an embodiment of this application.

The second trigger message may be RRC signaling such as select signaling, and a name is not limited, or the second trigger message may be MAC signaling such as MAC CE or a MAC subheader, as described below. As shown in FIG. 4c, an LCID identifier indicates the second trigger message. For example, a number corresponding to an LCID binary number is 35, to indicate that the MAC subheader is received, and a counter value is decreased by 1. R is a reserved bit, and may be reserved or indicate whether to be used for passive IoT, RFID, or another internet of things terminal. An LCID is a logic channel identifier.

Alternatively, the second trigger message may be a queryrep command. In an actual application process, the second trigger message may alternatively be another command. This is not limited herein.

After the target tag receives the second trigger message, the target tag subtracts 1 from the value of the random number K, to indicate that one slot has passed. When a value of K is decreased to 0, it indicates that the target tag can initiate access to the reader/writer. For example, when the value of K is 55, after the target tag receives the second trigger message for 55 times, the value of K is decreased to 0, to indicate that 55 slots have passed, and the target tag initiates access to the reader/writer.

Step 305: The target tag sends first access information to the reader/writer.

When the value of the random number K is decreased to 0, the target tag determines a first slot. The first slot is used to send the first access information to the reader/writer for access. The first access information may carry a first identity. The first identity is used to identify the target tag.

In an implementation, the first slot may be determined based on the value of Q and the value of K in step 302. For example, the first slot may be recorded as K, namely, the random number K. Because the random number K initiates access when updated to 0, K corresponds to a quantity of slots for waiting for access. Therefore, K may be used as the first slot.

The first identity may be RN16 or other identification information. RN16 indicates 16-bit binary code. RN16 of each target tag is different. In an actual application process, the first identity may also be indicated in another manner. This is not limited herein. RN16 indicates a 16-bit random number. MAC CE of RN16 may be shown in FIG. 4d.

Figure 4D:
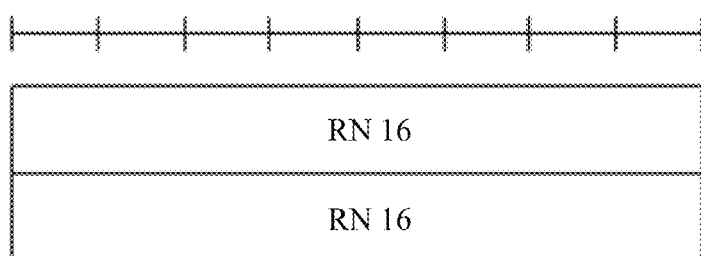
FIG. 4d is a diagram of another structure of signaling according to an embodiment of this application.

After receiving the identity, the target tag sends the first identity or a part of the first identity, or sends acknowledgment information to the reader/writer, to indicate that tag access succeeds. After receiving the first identity, the reader/writer establishes a connection to the target tag, and replies with one identity acknowledgment message. The identity acknowledgment message may also carry information about the first identity. The identity acknowledgment message indicates that the reader/writer receives the first identity sent by the target tag. For example, the identity acknowledgment message may be an ACK message, or an RN16 identifier, or a conflict resolution identifier. As shown in FIG. 4d, compared with RN16, this message is a downlink message. This is not limited herein.

After the first identity is sent, if the target tag does not receive, within a preset time period, the identity acknowledgment message sent by the reader/writer, or an identity carried in a received identity acknowledgment message is not of the target tag, it indicates that the target tag fails to receive the identity acknowledgment information sent by the reader/writer. The identity acknowledgment information ACK may be shown in FIG. 4d.

Step 306: The target tag stores the first slot.

When the target tag fails to receive the identity acknowledgment information sent by the reader/writer, the target tag stores the first slot. The first slot indicates a quantity of slots corresponding to an access failure of the target tag. The access failure indicates that the target tag fails to receive the acknowledgment message or a response message sent by the reader/writer.

In an implementation, after access fails, the target tag may further store a corresponding level quantity. In other words, when the target tag fails to perform access for the first time, it indicates that collision occurs, and the target tag stores a level quantity corresponding to a first collision.

It should be noted that all or some steps of step 301 to step 306 may be repeatedly performed for several times (for example, the first trigger message may be sent repeatedly for several times, and a corresponding matched tag may also perform an access operation accordingly), to accurately estimate a quantity of tags and adjust a proper frame length, so that better inventory efficiency can be achieved during subsequent steps, that is, access efficiency improvement in an entire access process is ensured.

When the foregoing process is repeated, if an estimated quantity of tags is small, for example, 200 or 300, the foregoing process may be repeated for two or three times. If an estimated quantity of tags is large, the foregoing process may be repeated for three or four times or more. In other words, a quantity of times for estimating the quantity of tags varies with different quantities of tags. In other words, a threshold range of a quantity of first tags corresponds to a first repetition times range, and a threshold range of a quantity of second tags corresponds to a second repetition range.

Step 307: The reader/writer sends a third trigger message to the target tag.

After detecting a slot in which collision occurs, the reader/writer sends the third trigger message to a target tag corresponding to the slot in which collision occurs first. The third trigger message carries a target slot. The target slot includes the first slot, and optionally includes target flag information. The third trigger message indicates the target flag information and indicates a target tag corresponding to the target slot to generate a random number m, where m is a positive integer greater than 0.

Figure 4E:
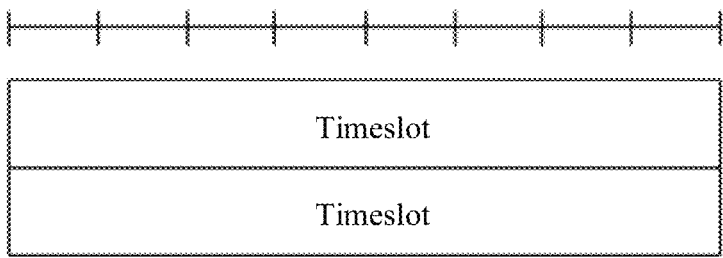
FIG. 4e is a diagram of another structure of signaling according to an embodiment of this application.

The third trigger message may be RRC signaling such as select signaling, and a name is not limited, or the third trigger message may be MAC signaling such as MAC CE. The MAC CE carrying a quantity of slots may be shown in FIG. 4e.

After detecting that collision occurs, the reader/writer sends the third trigger message to all target tags corresponding to the slot in which collision occurs. The target slot in the third trigger message may be a single slot, or may include a plurality of first collision slots. The plurality of first collision slots include the first slot for enabling the tag to re-initiate access, that is, generate a random number M. A value range of M may be $(0, 2^P-1)$, where P is a positive integer greater than 0. The target flag information may include the consecutive mask or the nonconsecutive mask. This is not limited herein.

Optionally, the first trigger message includes the first parameter Q used by the target tag to generate the random number M based on the first parameter Q.

Optionally, the third trigger message may be bound to the Q value by default and does not need to be sent. For example, if the bound Q value is 2, there are the four slots that can be used by the first tag device to select one of the slots to access the reader/writer. An advantage of the Q value being 2 is that access efficiency or access system efficiency can be improved, so that average access efficiency or system efficiency can reach more than 40%.

Optionally, same signaling may be reused by the first trigger information and the third trigger information.

Optionally, the third trigger message may include mask information that is the same as mask information of the first trigger message, or may carry identification information of the tag or partial identification information of the tag.

In an implementation, the reader/writer may alternatively carry a P value in the third trigger message. The P value may be the same as the Q value, or may be an updated Q value. For example, P=Q+n, P=Q-n, or P=Q*n, where n is a positive integer greater than or equal to 1. The updated Q value is carried, so that the value range of m can be adjusted more flexibly, an adjustment step is larger, and the signaling overheads caused by adjusting the Q value are reduced.

In an implementation, the target slot may indicate the first slot, or may indicate another collision slot, or may indicate a slot range. In other words, the target slot may be a plurality of consecutive first collision slots, or a plurality of discrete first collision slots. This is not limited herein. For example, a third message may carry a start collision slot and an end collision slot. If there is only the start collision slot, and the end collision slot is empty or unavailable, it indicates that only tags that collide in the start collision slot perform access. When there is only the end collision slot without the start collision slot, a principle is the same. For example, a target slot indicator (y, z) indicates that a collision slot is y to z. Alternatively, y may alternatively indicate 2y-1, z is 2z-1, and then, (y, z) indicates (2y-1, 2z-1), and indicates that collision occurs in a slot from 2y-1 to 2z-1. Alternatively, y may alternatively indicate $2^y-1$, z is 2z-1, and then, (y, z) indicates $(2^y-1, 2^z-1)$. In an implementation, the third trigger message may alternatively indicate all collision slots. This is not limited herein.

In an implementation, one piece of indication information may also be included, and indicates all current tags that fail to perform access and in which collision occurs to perform access. In other words, a slot does not need to be specifically indicated.

A collision slot is indicated, and the tag performs access, to implement packet access. This avoids access of a large quantity of tags at the same time, reduces a collision probability generated during the tag access, and improves access efficiency.

Step 308: The target tag performs re-access based on the third trigger message.

Optionally, after the target tag receives the third trigger message, the target tag generates the random number M based on the third trigger message.

The random number may be transmitted by using RRC signaling, and a name is not limited, or the random number may be transmitted by using MAC signaling, such as MAC CE.

After the target tag generates the random number M, when the random number M is updated to 0, the target tag continues to initiate access, and repeats step 307 and step 308 until the target tag successfully accesses the reader/writer.

Figure 7:
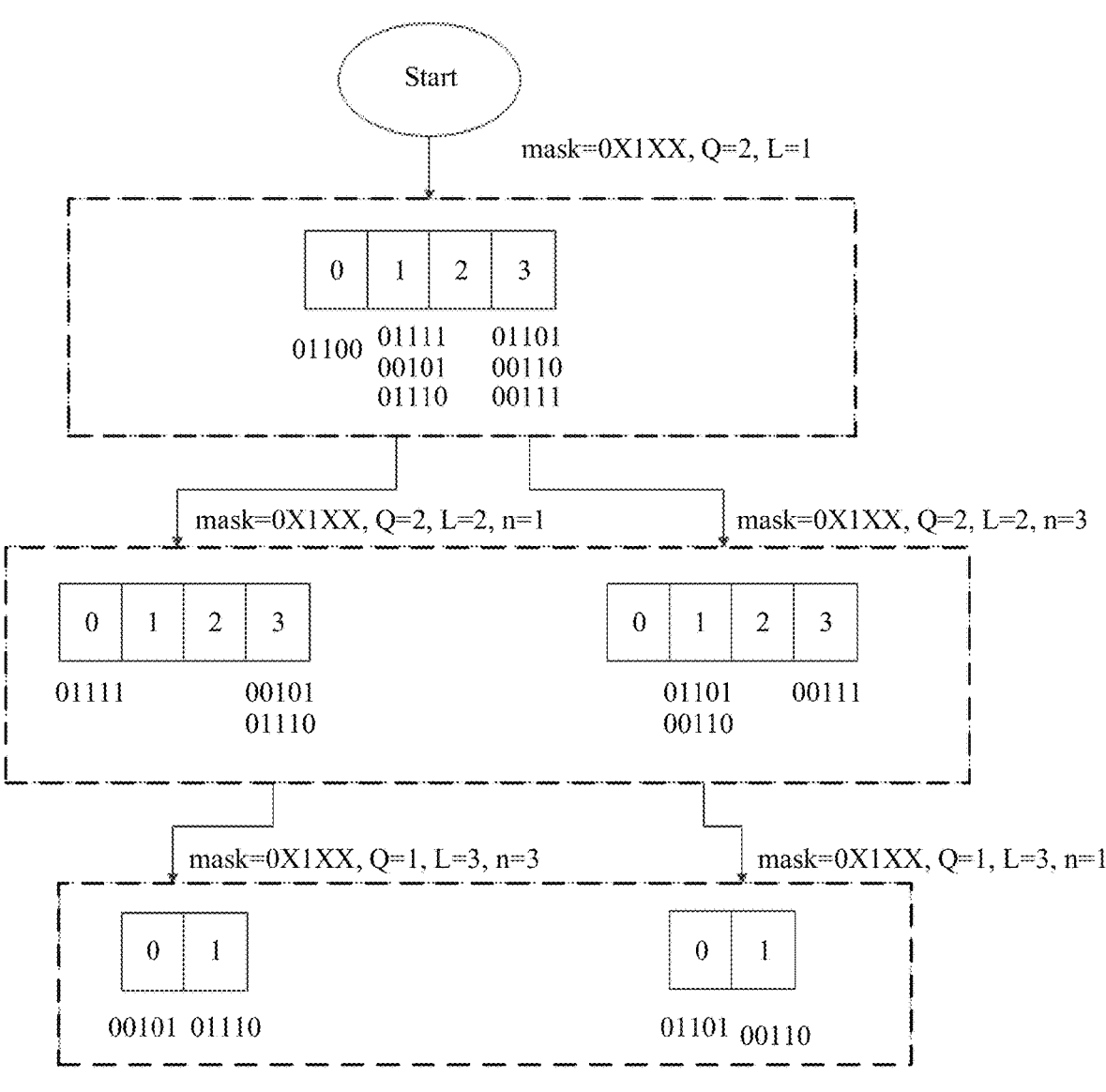
FIG. 7 is another flowchart of a data transmission method according to an embodiment of this application.

For example, as shown in FIG. 7, the select instruction sent by the reader/writer includes target flag information mask, the Q value, and a level quantity L. In a first round of access slots, mask=0X1XX, Q=2, and L=1. A tag 01100 of a slot 0 does not collide. Three tags 01111, 00101, and 01110 of a slot 1 collide. Tags 01101, 00110, and 00111 of a slot 3 also collide. During next access, the reader/writer sends the third trigger message. A target slot n=1 carried in the third trigger message indicates that a tag in which a slot is 1 initiates access again. In this case, tag collision occurs again. The reader/writer initiates a new round of access. Each tag generates the random number m, and initiates access again when m is 0. In this case, L is updated to 2, and the Q value remains unchanged. In this round of access, the tag 01111 of the slot 0 does not collide. The tags 00101 and 01110 of the slot 3 collide again. Therefore, in a next round of access, the reader/writer updates L to 3, the Q value remains unchanged, and the reader/writer sends a trigger message to all tags of the slot 3 to enable tags that collide in the slot 3 and whose level quantities are 2 to perform re-access. During a third access, tags of both slot 0 and slot 1 perform access successfully. However, the corresponding tags 01101, 00110, and 00111 of the slot 3 at a first level start to perform access after the tags 01111, 00101, and 01110 of the slot 1 at the first level perform access. An access manner is similar to a tag access manner of the slot 1 at the first level. Details are not described herein again. It may be understood that, in this implementation, after a tag of the slot 1 at the first level completes access, regardless of whether access is successful, tags that collide in the slot 3 at a second level stop access, and three tags of the slot 3 at the first level are selected. In another feasible manner, after collision occurs in the slot 1 in the first round, and collision occurs again in a second round of access, the reader/writer may alternatively first select tags that collide in the slot 3 at the first level in the first round to continue to perform access. In other words, an access manner may be vertical or horizontal.

In an implementation, as long as a total quantity or a maximum quantity of collision slots in each round of access is less than a collision slot and a corresponding tag does not perform re-access, the level quantity may not be carried. Only a quantity of collision periods is carried. This is not limited herein.

In an implementation, after the reader/writer sends the third trigger message, the tag may perform re-access based on the quantity of slots and/or the level quantity that are/is carried in the third trigger message. A manner to perform access may be based on a slot ALOHA, or may be based on a binary search tree, or another access manner, which is not limited herein.

It should be noted that, as long as there is a tag that does not perform access, step 307 and step 308 may continue to be repeated until all tags perform access successfully.

In embodiments of this application, the third trigger message carries the quantity of first slots, and the quantity of first slots indicates the quantity of slots corresponding to the access failure of the target tag, so that tags that collide in a same slot perform the next round of access. This avoids collision of different slots in the same slot in the next round, reduces a collision probability, and improves tag access efficiency.

The foregoing describes the data processing method in embodiments of this application. The following describes an answer device and the read/write device in this application.

Figure 8:
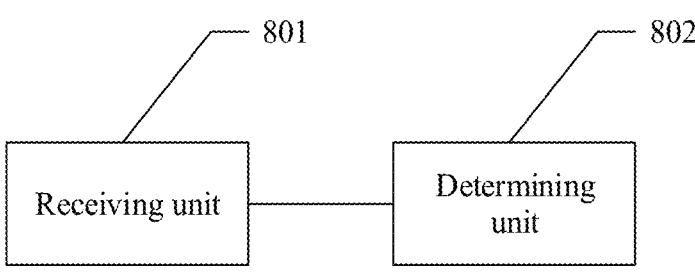
FIG. 8 is a diagram of a structure of an answer device according to an embodiment of this application.

FIG. 8 is a diagram of a structure of a network device according to an embodiment of this application.

An answer device includes:

a receiving unit 801, configured to receive first signaling sent by a read/write device, where the first signaling carries target flag information, the target flag information is used to determine the answer device, and first flag information of the answer device matches the target flag information; and a determining unit 802, configured to determine a first slot, and send first access information to the read/write device in the first slot.

In this embodiment, a method performed by units of the answer device is similar to a method performed by a target tag in the foregoing embodiment. Details are not described herein again.

FIG. 9 is a diagram of another structure of an answer device according to an embodiment of this application.

An answer device includes:

a receiving unit 901, configured to receive first signaling sent by a read/write device, where the first signaling carries target flag information, the target flag information is used to determine the answer device, and first flag information of the answer device matches the target flag information; and a determining unit 902, configured to determine a first slot, and send first access information to the read/write device in the first slot.

Optionally, if the receiving unit fails to receive an acknowledgment message sent by the read/write device, the answer device further includes:

a storage unit 903, configured to store the first slot. The first slot indicates a quantity of slots corresponding to an access failure of the answer device. The access failure indicates that the answer device fails to receive a response message sent by the read/write device for the first access information sent by the answer device.

The receiving unit 901 is further configured to receive a third trigger message sent by the read/write device. The third trigger message carries a target slot. The target slot includes the first slot. The third trigger message indicates the answer device corresponding to the target slot to perform re-access.

Optionally, the third trigger message carries the target flag information.

Optionally, the target flag information includes a nonconsecutive mask, and the nonconsecutive mask includes at least two nonconsecutive bits.

Optionally, the third trigger message includes a variable P, where P=Q+n, P=Q–n, or P=Q*n, n is a positive integer greater than or equal to 1, and Q is used by the answer device to determine the first slot.

Optionally, the first signaling and/or the third trigger message belong/belongs to any one of the following: RRC signaling, a MAC subheader, or MAC CE signaling.

Optionally, the third trigger message further carries a level quantity. The level quantity indicates a quantity of times that collision occurs in the answer device. The third trigger message indicates the answer device that matches the target flag information, the target slot, and the level quantity to perform re-access.

Optionally, the target slot includes a plurality of first collision slots, and the first collision slot includes the first slot.

Optionally, target slots are a plurality of consecutive first collision slots, or target slots are a plurality of discrete first collision slots.

In this embodiment, a method performed by units of the answer device is similar to a method performed by a target tag in the foregoing embodiment. Details are not described herein again.

FIG. 10 is a diagram of a structure of a read/write device according to an embodiment of this application.

A read/write device includes:

a sending unit 1001, configured to send first signaling to an answer device, where the first signaling carries target flag information, the target flag information is used to determine the answer device, and first flag information of the answer device matches the target flag information; and a receiving unit 1002, configured to receive first access information sent by the answer device.

In this embodiment, a method performed by units of the read/write device is similar to a method performed by the read/write device in the foregoing embodiment. Details are not described herein again.

FIG. 11 is a diagram of another structure of a read/write device according to an embodiment of this application.

A read/write device includes:

a sending unit 1101, configured to send first signaling to an answer device, where the first signaling carries target flag information, the target flag information is used to determine the answer device, and first flag information of the answer device matches the target flag information; and a receiving unit 1102, configured to receive first access information sent by the answer device.

Optionally, when the read/write device detects that an access failure occurs in the answer device, the read/write device further includes:

a storage unit 1103, configured to store a first slot of the answer device. The first slot indicates a quantity of slots corresponding to the access failure of the answer device. The access failure indicates that the answer device fails to receive a response message sent by the read/write device for the first access information sent by the answer device.

The sending unit 1101 is further configured to send a third trigger message. The third trigger message carries a target slot. The target slot includes the first slot. The third trigger message indicates the answer device corresponding to the target slot to perform re-access.

Optionally, the third trigger message carries the target flag information.

Optionally, the target flag information includes a nonconsecutive mask, and the nonconsecutive mask includes at least two nonconsecutive bits.

Optionally, the third trigger message includes a variable P, where P=Q+n, P=Q−n, or P=Q*n, n is a positive integer greater than or equal to 1, and Q is used by the answer device to determine the first slot.

Optionally, the first signaling and/or the third trigger message belong/belongs to any one of the following: RRC signaling, a MAC subheader, or MAC CE signaling.

Optionally, the third trigger message further carries a level quantity. The level quantity indicates a quantity of times that collision occurs in the answer device. The third trigger message indicates the answer device that matches the target flag information, the target slot, and the level quantity to perform re-access.

Optionally, the target slot includes a plurality of first collision slots, and the first collision slot includes the first slot.

Optionally, target slots are a plurality of consecutive first collision slots, or target slots are a plurality of discrete first collision slots.

In this embodiment, a method performed by units of the read/write device is similar to a method performed by the read/write device in the foregoing embodiment. Details are not described herein again.

Figure 12:
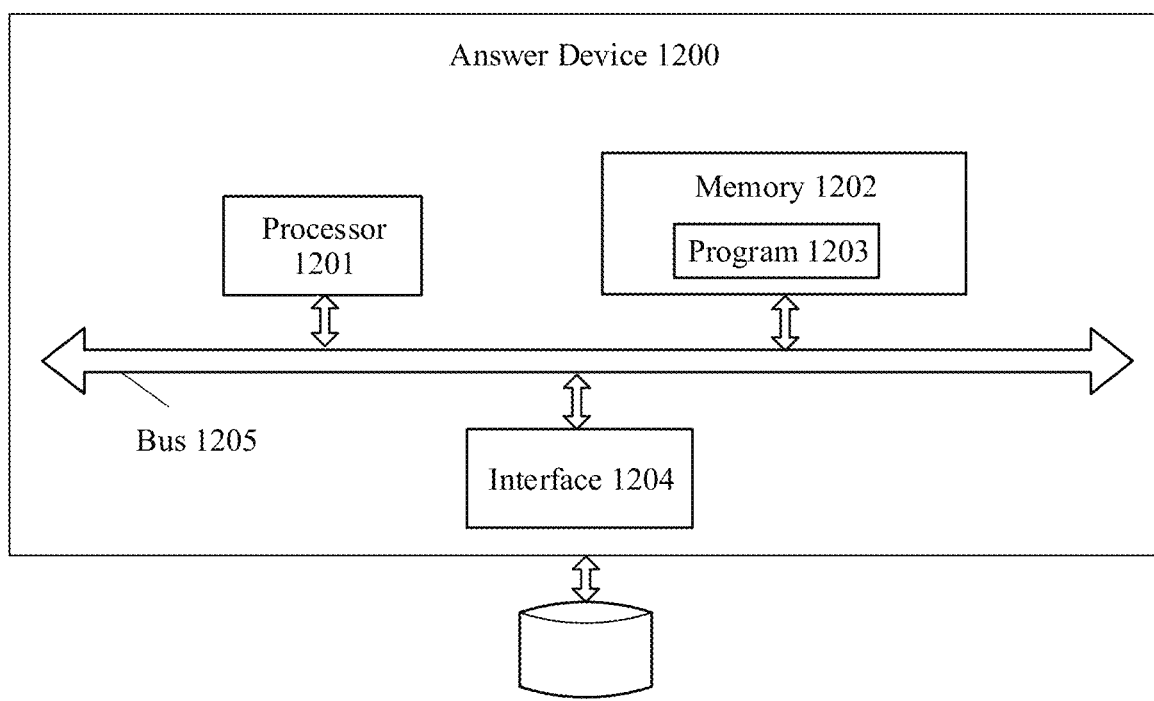
FIG. 12 is a diagram of another structure of an answer device according to an embodiment of this application.

FIG. 12 is a diagram of an answer device 1200 according to an embodiment of this application.

The answer device 1200 includes a processor 1201, a memory 1202, a bus 1205, and an interface 1204. The processor 1201 is connected to the memory 1202 and the interface 1204. The bus 1205 is respectively connected to the processor 1201, the memory 1202, and the interface 1204. The interface 1204 is configured to receive or send data. The processor 1201 is a single-core or multi-core central processing unit, or an application-specific integrated circuit, or one or more integrated circuits configured to implement this embodiment of the present disclosure. The memory 1202 may be a random access memory (RAM), or may be a non-volatile memory, for example, at least one hard disk memory. The memory 1202 is configured to store computer-executable instructions. The computer-executable instructions may include a program 1203.

In this embodiment, when the processor 1201 invokes the program 1203, the answer device in FIG. 12 is enabled to perform operations performed by a target tag in the foregoing embodiment shown in FIG. 3. Details are not described herein again.

Figure 13:
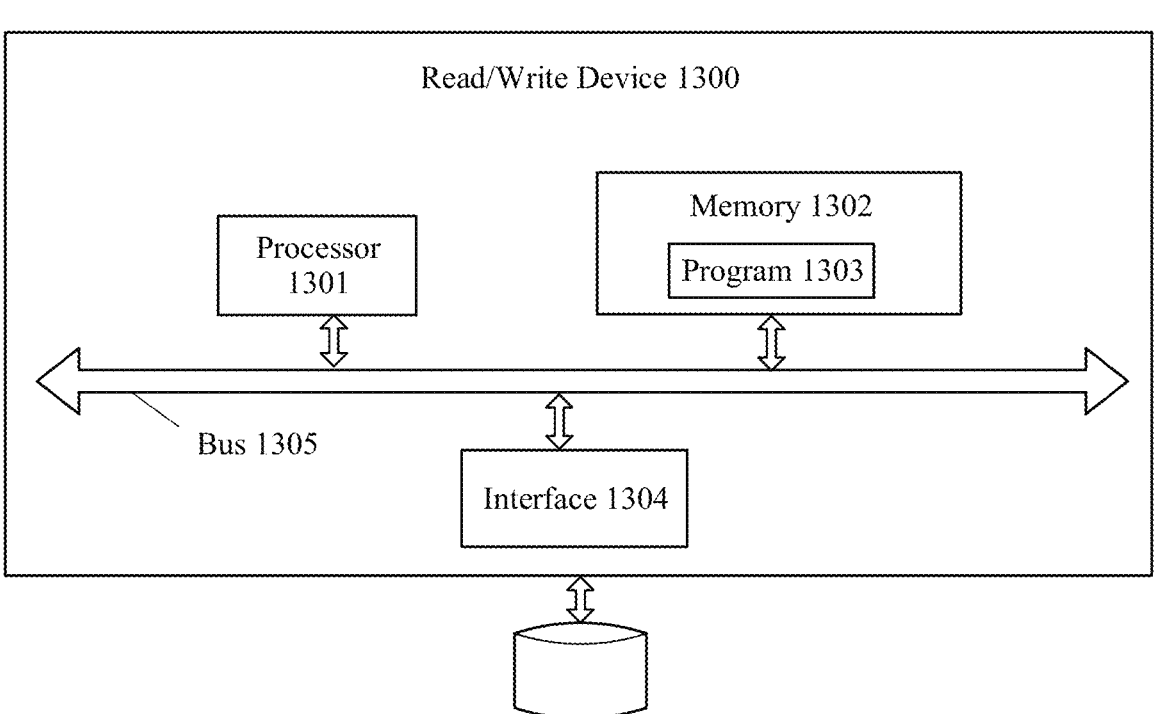
FIG. 13 is a diagram of another structure of a read/write device according to an embodiment of this application.

FIG. 13 is a diagram of a read/write device 1300 according to an embodiment of this application.

The device includes a processor 1301, a memory 1302, a bus 1305, and an interface 1304. The processor 1301 is connected to the memory 1302 and the interface 1304. The bus 1305 is respectively connected to the processor 1301, the memory 1302, and the interface 1304. The interface 1304 is configured to receive or send data. The processor 1301 is a single-core or multi-core central processing unit, or an application-specific integrated circuit, or one or more integrated circuits configured to implement this embodiment of the present disclosure. The memory 1302 may be a random access memory (RAM), or may be a non-volatile memory, for example, at least one hard disk memory. The memory 1302 is configured to store computer-executable instructions. The computer-executable instructions may include a program 1303.

In this embodiment, when the processor 1301 invokes the program 1303, the read/write device in FIG. 13 is enabled to perform operations performed by a read/write device in the foregoing embodiment shown in FIG. 3. Details are not described herein again.

It should be understood that, the processor mentioned in the answer device or read/write device in the foregoing embodiments of this application or the processor provided in the foregoing embodiments of this application may be a central processing unit (CPU), or may be another general-purpose processor, a digital signal processor (DSP), an application-specific integrated circuit (ASIC), a field-programmable gate array (field-FPGA), or another programmable logic device, a discrete gate or a transistor logic device, a discrete hardware component, or the like. The general-purpose processor may be a microprocessor, or the processor may be any conventional processor or the like.

It should be further understood that there may be one or more processors in the answer device or the read/write device in the foregoing embodiments of this application, and a quantity of processors may be adjusted based on an actual application scenario. This is merely an example for description herein and is not limited. In embodiments of this application, there may be one or more memories, and may be adjusted based on an actual application scenario. This is merely an example for description herein and is not limited.

It should be further noted that, when the answer device or the read/write device includes a processor (or a processing unit) and a memory, the processor in this application may be integrated with the memory, or the processor may be connected to the memory by an interface. This may be adjusted based on an actual application scenario. This is not limited.

This application provides a chip system. The chip system includes a processor, configured to support an answer device or a read/write device in implementing a function of a controller in the foregoing method, for example, processing data and/or information in the foregoing method. In an embodiment, the chip system further includes a memory. The memory is configured to store necessary program instructions and necessary data. The chip system may include a chip, or may include a chip and another discrete device.

In another embodiment, when the chip system is a chip in user equipment or an access network or the like, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the answer device or the read/write device or the like performs the steps performed by the answer device or the read/write device in any embodiment in FIG. 3 or FIG. 4. Optionally, the storage unit is a storage unit in the chip, for example, a register or a cache; or the storage unit may be a storage unit located outside the chip in the answer device or the read/write device, for example, a read-only memory (ROM) or another type of static storage device capable of storing static information and instructions, or a random access memory (RAM).

An embodiment of this application further provides a computer-readable storage medium. The computer-readable storage medium stores a computer program. When the computer program is executed by a computer, a method procedure performed by the controller of the answer device or the read/write device in any one of the foregoing method embodiments is implemented. Correspondingly, the computer may be the foregoing answer device or the read/write device.

It should be understood that the controller or the processor mentioned in the foregoing embodiments of this application may be a central processing unit (CPU), or may be a combination of one or more of another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that, in the foregoing embodiments of this application, there may be one or more processors or controllers in the answer device, the read/write device, the chip system, or the like, which may be adjusted based on an actual application scenario. This is merely an example for description herein and is not limited. In embodiments of this application, there may be one or more memories, and may be adjusted based on an actual application scenario. This is merely an example for description herein and is not limited.

It should also be understood that the memory, the readable storage medium, or the like mentioned in answer device, the read/write device, or the like in the foregoing embodiments of this application may be a volatile memory or a nonvolatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAM may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink link dynamic random access memory (SLDRAM), and a direct rambus random access memory (DR RAM).

A person of ordinary skill in the art may understand that all or some of the steps performed by the answer device, the read/write device, or the processor in the foregoing embodiments may be implemented by hardware or a program instructing related hardware. The program may be stored in a computer-readable storage medium. The storage medium mentioned above may be a read-only memory, a random access memory, or the like. For example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether these functions are performed by hardware or software depends on particular applications and design constraints of the technical solutions. A person skilled in the art may use different methods to implement the described functions for each particular application, but it should not be considered that the implementation goes beyond the scope of this application.

When the software is used to implement embodiments, the method steps in the foregoing embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like.

In the specification, claims, and accompanying drawings of this application, the terms such as "first" and "second" are intended to distinguish between similar objects but do not necessarily indicate an order or sequence. It should be understood that the terms used in this way may be interchanged in appropriate cases, and this is merely a manner of distinguishing between objects with a same attribute for description in embodiments of this application. Moreover, terms "including" and "with" and any variations thereof are intended to cover non-excluding inclusions, so that a process, method, system, product, or device that includes a series of units is not necessarily limited to those units, but may include other units not expressly listed or inherent to such a process, method, system, product, or device.

The terms used in embodiments of this application are merely for the purpose of illustrating enclosed embodiments, and are not intended to limit the present disclosure. Terms "a", "the", and "this" of singular forms used in embodiments of this application are also intended to include plural forms, unless otherwise specified in a context clearly. It should be further understood that, in the descriptions of this application, "I" represents an "or" relationship between associated objects, unless otherwise specified. For example, A/B may represent A or B. A term "and/or" in this application is merely an association relationship between associated objects, and represents that three relationships may exist. For example, A and/or B may represent the following three cases: Only A exists, both A and B exist, and only B exists, where A and B each may be singular or plural.

Depending on the context, for example, words "if" used herein may be explained as "while" or "when" or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detecting (the stated condition or event)".

In conclusion, the foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A data transmission method, comprising:

receiving, by an answer device, first signaling sent by a read/write device, the first signaling carrying target flag information;

determining, by the answer device, that the target flag information matches a first flag information;

determining, by the answer device, a first slot based on the target flag information matching the first flag information;

sending, by the answer device, first access information to the read/write device in the first slot;

storing, by the answer device, the first slot if the answer device failed to receive an acknowledgment message sent by the read/write device, the first slot indicating a quantity of slots corresponding to an access failure of the answer device, the access failure indicating that the answer device failed to receive a response message sent by the read/write device for the first access information sent by the answer device; and receiving, by the answer device, a third trigger message sent by the read/write device, the third trigger message carrying a target slot comprising the first slot, the third trigger message indicating the answer device corresponding to the target slot to perform re-access, the third trigger message comprising a variable P, P=Q+n, P=Q−n, or P=Q*n, n is a positive integer greater than or equal to 1, and Q is used by the answer device to determine the first slot.

2. The method according to claim 1, wherein the third trigger message carries the target flag information.

3. The method according to claim 1, wherein the target flag information comprises a nonconsecutive mask, and the nonconsecutive mask comprises at least two nonconsecutive bits.

4. The method according to claim 1, wherein one or both of the first signaling and the third trigger message belong to any one of: a radio resource control (RRC) signaling, a medium access control (MAC) subheader, or a medium access control control element (MAC CE) signaling.

5. A data transmission method, comprising:

sending, by a read/write device, first signaling to an answer device, the first signaling carrying target flag information, the target flag information is used to determine the answer device;

receiving, by the read/write device, first access information sent by the answer device if a first flag information of the answer device matches the target flag information;

storing, by the read/write device, a first slot of the answer device if the read/write device detects that an access failure occurred in the answer device, the first slot indicating a quantity of slots corresponding to the access failure of the answer device, and the access failure indicating the answer device failed to receive a response message sent by the read/write device for the first access information sent by the answer device; and sending, by the read/write device, a third trigger message, the third trigger message carrying a target slot comprising the first slot, the third trigger message indicating the answer device corresponding to the target slot to perform re-access, the third trigger message comprising a variable P, wherein P=Q+n, P=Q−n, or P=Q*n, n is a positive integer greater than or equal to 1, and Q is used by the answer device to determine the first slot.

6. The method according to claim 5, wherein the third trigger message carries the target flag information.

7. The method according to claim 5, wherein the target flag information comprises a nonconsecutive mask, and the nonconsecutive mask comprises at least two nonconsecutive bits.

8. An answer device, comprising:

a memory storing instructions; and at least one processor in communication with the memory, the at least one processor configured, upon execution of the instructions, to perform the following steps:

receive first signaling sent by a read/write device, the first signaling carrying target flag information;

determine that the target flag information matches a first flag information;

determine a first slot based on the target flag information matching the first flag information;

send first access information to the read/write device in the first slot;

store the first slot if the answer device failed to receive an acknowledgment message sent by the read/write device, the first slot indicating a quantity of slots corresponding to an access failure of the answer device, the access failure indicating that the answer device failed to receive a response message sent by the read/write device for the first access information sent by the answer device; and receive a third trigger message sent by the read/write device, the third trigger message carrying a target slot comprising the first slot, the third trigger message indicating the answer device corresponding to the target slot to perform re-access, the third trigger message comprising a variable P, P=Q+n, P=Q−n, or P=Q*n, n is a positive integer greater than or equal to 1, and Q is used by the answer device to determine the first slot.

9. The answer device according to claim 8, wherein the third trigger message carries the target flag information.

10. The answer device according to claim 8, wherein the target flag information comprises a nonconsecutive mask, and the nonconsecutive mask comprises at least two nonconsecutive bits.

11. The answer device according to claim 8, wherein the first signaling and/or the third trigger message belong/belongs to any one of: a radio resource control (RRC) signaling, a medium access control (MAC) subheader, or a medium access control control element (MAC CE) signaling.

12. A read/write device, comprising:

a memory storing instructions; and at least one processor in communication with the memory, the at least one processor configured, upon execution of the instructions, to perform the following steps:

send first signaling to an answer device, the first signaling carrying target flag information, the target flag information is used to determine the answer device;

receive first access information sent by the answer device if a first flag information of the answer device matches the target flag information;

store a first slot of the answer device if the read/write device detects that an access failure occurred in the answer device, the first slot indicating a quantity of slots corresponding to the access failure of the answer device, and the access failure indicating the answer device failed to receive a response message sent by the read/write device for the first access information sent by the answer device; and send a third trigger message, the third trigger message carrying a target slot comprising the first slot, the third trigger message indicating the answer device corresponding to the target slot to perform re-access, the third trigger message comprising a variable P, wherein P=Q+n, P=Q−n, or P=Q*n, n is a positive integer greater than or equal to 1, and Q is used by the answer device to determine the first slot.

13. The read/write device according to claim 12, wherein the third trigger message carries the target flag information.

14. The read/write device according to claim 12, wherein the target flag information comprises a nonconsecutive mask, and the nonconsecutive mask comprises at least two nonconsecutive bits.

\* \* \* \* \*